Aug. 28, 1962

A. D. KOMPELIEN 3,051,165

APPARATUS FOR AUTOMATICALLY MEASURING BLOOD
PRESSURE AND PULSE RATE

Filed Oct. 14, 1959

INVENTOR.
ARLON D. KOMPELIEN

BY Joseph E Ryan
ATTORNEY

Aug. 28, 1962   A. D. KOMPELIEN   3,051,165
APPARATUS FOR AUTOMATICALLY MEASURING BLOOD
PRESSURE AND PULSE RATE
Filed Oct. 14, 1959   2 Sheets-Sheet 2

INVENTOR.
ARLON D. KOMPELIEN
BY
Joseph E. Ryan
ATTORNEY

United States Patent Office 3,051,165
Patented Aug. 28, 1962

3,051,165
APPARATUS FOR AUTOMATICALLY MEASURING BLOOD PRESSURE AND PULSE RATE
Arlon D. Kompelien, Richfield, Minn., assignor to Minneapolis-Honeywell Regulator Company, Minneapolis, Minn., a corporation of Delaware
Filed Oct. 14, 1959, Ser. No. 846,468
10 Claims. (Cl. 128—2.05)

My invention relates to apparatus for sensing and recording blood pressure and pulse rate and more particularly to an improved apparatus for automatically sensing such physical functions on a human being.

Medical apparatus which performs sensing and recording functions automatically and simply has become of increased importance as a means for replacing the manual operations performed by those working in the medical field in connection with operative and post-operative patient care and in connection with research of a medical nature. Increased accuracy and repeatability of measurement are significant both from a research standpoint and from the operational standpoint of modern hospital facilities. The present invention is directed to a photoelectric pneumatic process of sensing the human function of diastolic and systolic blood pressure and pulse rate in an improved automatic apparatus which provides for extreme accuracy of reading or measurement and continuing records relative to patient care. In the research field, physical body functions are being examined in the field of aviation or avionics and continuous records of the physical characteristics of patients or subjects of research investigation are becoming essential. The photoelectric method of detecting the presence of blood in a portion of the human body has been previously utilized in connection with oxygen analysis of blood and has also been utilized in connection with the measurement of blood pressure. The present apparatus permits rapid and numerous measurements of these body functions accurately and rapidly with a continuous indication and record of these functions without requiring any manual operation. It is therefore an object of this invention to provide an improved electrical apparatus for automatically sensing and recording a plurality of body functions. It is further an object of this invention to provide an improved electrical apparatus for the measurement of the physical function of systolic and diastolic blood pressure.

Another object of this invention is to provide an improved apparatus for measuring blood pressure which performs the measurement of a rise in cuff pressure. A still further object of this invention is to provide an improved apparatus of this type which permits rapid measurement of blood pressure and pulse rate in a continuous sequence without effecting physical response or discomfort of the body to which it is applied. These and other objects of this invention will become apparent from a reading of the attached description together with the drawings wherein.

One of the most variable and difficult to measure of all human functions with repeatability of results and accuracy is that of blood pressure. While accuracy and measurement may be obtained through arterial punctures, this method is normally not feasible in patient care. The sphygmomanometer or arm cuff which is used in the measurement of blood pressure on human beings is further not a feasible apparatus for the continuous measurement of blood pressure because of inaccuracies caused by the effect of continuous pressure on the portion of the body to which it is applied. The present apparatus utilizes an ear piece or cuff in which a light source photocell combination or photoelectric pickup is utilized to determine the amount of light transmitted through the tissue of the ear as a means for determining blood content of the organ and hence the effect of pressure on the same. This approach and apparatus were basically used in connection with studies of oxygen content and blood and has also been used in connection with measurement of blood pressure in medical research. However the approach utilized to date has not provided for continuous and automatic measurement of blood pressure. Therefore the arrangement and apparatus for performing this automatic measurement is the subject of the present invention.

Figure 1:
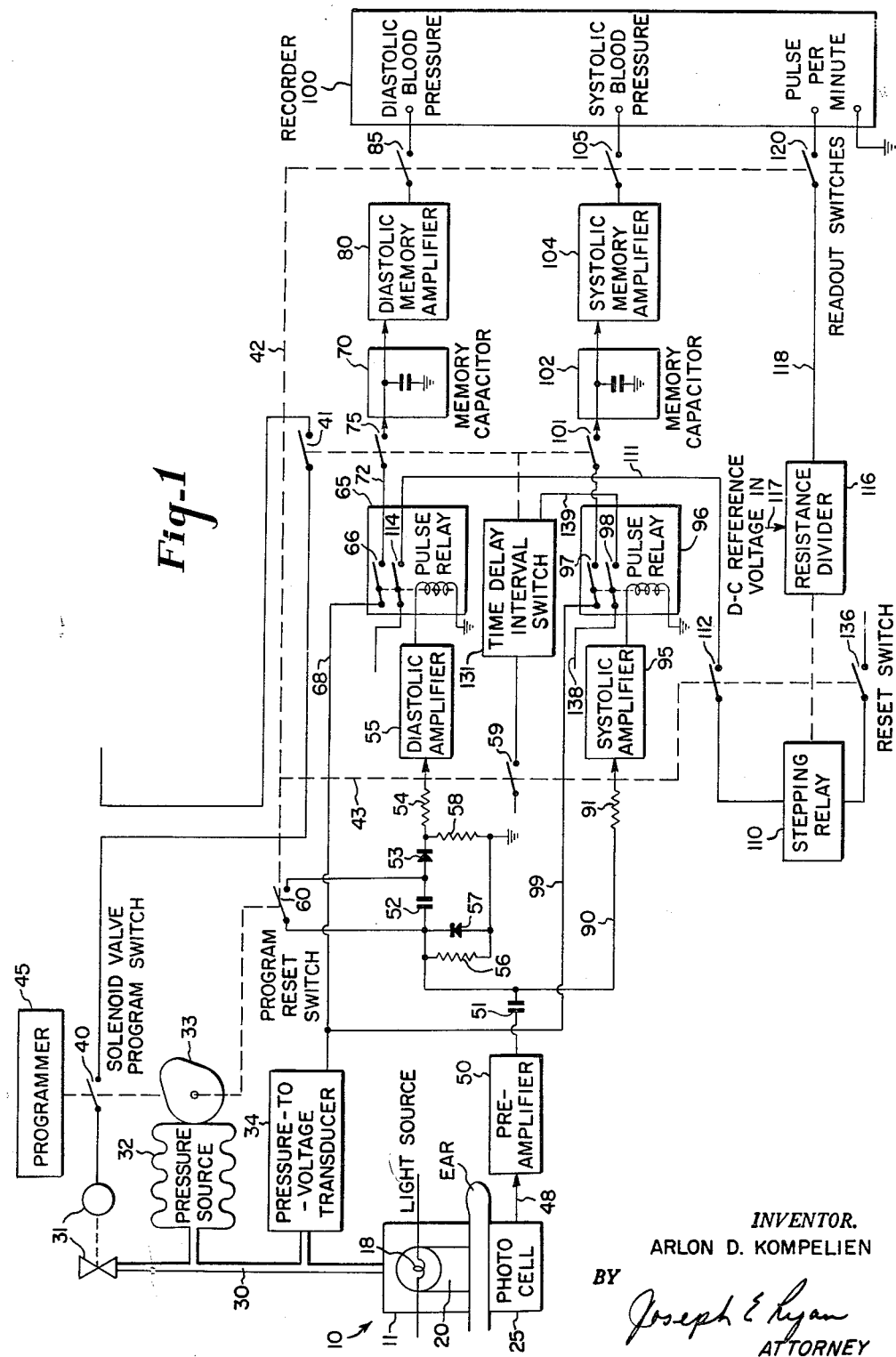
FIGURE 1 is a schematic drawing of the improved apparatus.
Figure 2:
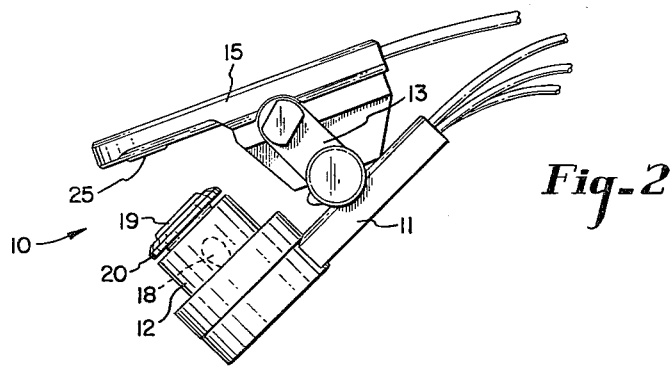
FIGURE 2 is a diagrammatic view of an ear cuff used in the improved measurement apparatus.

The ear piece as shown in FIGURE 2 includes basically a two part structure indicated generally at 10 as including a first part 11 having a cylindrical member 12 mounted thereon and the upstanding portion 13 to which the second part 15 of the ear piece is connected and pivoted. The cylindrical portion 12 includes a light source indicated schematically in FIGURE 1 at 18 and an expansible chamber or pressure member 20 which chamber has a transparent surface 19 such that the light may be directed therethrough. The part 15 mounts thereon a photocell 25 so associated that the parts 15 and 11 may be pivoted together with a portion of the ear positioned therebetween and clamped in this relationship such that pressure may be applied to the chamber 20 and allowing expansion of the extremity of the chamber against the ear lobe forcing it against the piece 15 in which this photocell 25 is located forcing blood from the ear therebetween. A pin or locking mechanism on the ear piece (not shown) prevents the device from opening when pressure is applied to the chamber 20. In this position the light and photocell are directly in line and enough space exists between these parts so that there is no pressure applied to the ear in addition to that of the bellows.

Variation in opacity of the ear or portion of the body to which the ear piece is applied is caused by variation of blood content of the same to provide a varying amount of light from the source to the photocell to produce a signal output. With the transducer or ear piece on the ear and no pressure applied to the bellows the blood content in the ear or the capillaries pulses with normal blood flow causing the photocell to put out an alternating current type signal. As pressure in the bellows is slowly increased the alternating current signal from the photocell increases and reaches a maximum. This is caused by the pressure in the bellows forcing much of the blood from the ear except during a period when the blood is forced during heart pumping operation back through the capillaries. The pressure in the belllows corresponding to this point where the photocell signal is a maximum is the diastolic blood pressure. This signal is maximum since the pressure of the bellows is just able to squeeze out the blood in the capillaries at the minimum part of the blood pulsing pressure allowing the greatest change in light variations. As pressure in the chamber is increased still further, the signal decreases and approaches zero level indicating the least opacity or variation in density. The point where the pressure drops to zero is the systolic pressure point since the maximum part of the pulsing blood pressure just reaches a point where it can no longer push blood through the pressurized portion of the ear to vary the light of the photocell and hence the density of the ear remains uniform.

The apparatus for automatically measuring these functions in addition to the ear piece 10 includes an air source for varying the air pressure applied to the ear piece. A conduit or pipe indicated at 30 has connected thereto a valve 31 to vent the conduit, a variable pressure reservoir 32 operated by a cam 33 to vary the pressure in the conduit, and a pressure to voltage transducer 34 connected in the conduit 30 with a connection leading to the pressure chamber 20 of the ear piece. Valve 31 is a solenoid operated valve which is energized through a switch 40 operated from a programmer 45. The programmer also operates the cam 33 and other switches to be later identified. A broken line connection in FIGURE 1 at 42, 43 indicates the coupling to these switches. In addition, valve 31 is operated by a second control switch 41 which, as will be later noted, is controlled by a time delay interval switch. The pneumatic or pressure portion of the apparatus is initiated with operation of the valve 31 to close the conduit which is normally vented to the atmosphere. Air is then trapped in the conduit 30 and chamber 32 such that upon rotation of the cam 33 a pressure build up will be experienced in the chamber 20 of the ear piece to press against the ear causing the blood therein to be forced therefrom. The switch 40 or switch 41 will release or de-energize the valve 31 to allow the air in the conduit to rapidly vent to the atmosphere for release of pressure on the ear. The pressure to voltage transducer 34 provides an electrical signal output in accordance with the pressure in the chamber 20 of the ear piece, which signal will be indicative of the actual pressure applied to the portion of the ear. Programmer or master control 45 is controllably energized from a power source through a switching means (not shown) and will operate continuously for a given cycle to perform the blood pressure measurement and pulse measurement functions to be later described.

The photocell 25 of the ear piece is energized from a light source and will provide a variable signal output of the alternating current type which is connected through conductor means 48 to a preamplifier unit indicated in block form at 50. The details of the preamplifier together with the amplifiers and relays to be later defined are omitted herein for simplicity since they are conventional components. The output of the preamplifier section 50 is coupled through a condenser indicated at 51 to a voltage limiting network which permits the passage or flow of signals of pulsed voltage output only when the succeeding voltage signal is larger than the preceding voltage signal. This network includes a condenser 52 and a rectifier or diode 53 connected through a limiting resistor 54 to the diastolic amplifier indicated in block form at 55 with a restoring resistor 56 connected to ground connection and having a diode 57 in parallel circuit therewith. A further resistor 58 is also connected to ground connection beyond the diode 53. With this circuit arrangement the capacitor 52 charges to the peak output voltage from the preamplifier 50 each time the signal is higher than any preceding one. No signal will flow through the resistor 58 when signals of lesser amplitude occur since diode 53 remains back biased by the voltage on capacitor 52 during the time of these signals. Hence the diastolic amplifier 55 will respond only to a signal larger than the preceding charge on the condenser 52. Diodes 57 and 53 limit direction of current flow through this network.

Connected in parallel with the condenser 52 is a shorting or reset switch 60 operated through a mechanical connection of the step controller or programmer 45, the mechanical connection being schematically indicated at 42. Diastolic amplifier 55 provides a pulsed output which controls a conventional relay mechanism 65 having a contact or switch 66 which controls or connects the pressure to voltage transducer 34 to a memory capacitor or condenser indicated at 70. The schematic diagram in FIGURE 1 shows an electrical connection 68 schematically connecting the transducer 34 to the relay 65 to be controlled by the contacts 66 of the relay 65 and being connected through a conductor 72 and an interval switch contact 75, to be later defined, to the memory capacitor 70. The output of the memory capacitor 70 controls the energization of a diastolic memory amplifier 80 which responds to the charge on the condenser 70 to provide a signal output to a recorder indicated generally at 100. A read-out switch mechanism 85 is included in the output connection from the amplifier 80 to the recorder 100 to selectively connect the output of the amplifier 80 to the recorder. This read-out switch, as shown by the mechanical connection 42, is operated by the programmer 45 or as a part of the same. It should be recognized, however, that this portion of the apparatus may be included in the recorder drive to sequence with the operation of the programmer 45. A parallel circuit from the preamplifier 50 and coupling condenser 51 includes a conductor or electrical connection 90 and a limiting resistor 91 connected to a systolic amplifier indicated in block form at 95 whose output controls the operation of a pulsing relay 96 having a contact or switch 97 connecting the output of the pressure to voltage transducer 34 through the conductors or connection indicated at 99 to a circuit including an interval switch 101 and a memory capacitor 102. The output of the memory capacitor controls the energization of a systolic memory amplifier 104 whose output is coupled to the recorder 100 through a read-out switch indicated at 105. The read-out switch 105 like switch 85 may be operated through the mechanical connection 42 from the programmer or be included in the recorder.

Also connected to the output of the diastolic amplifier is a stepping relay or switch 110 which is connected in an electrical circuit indicated at 111 through a contact 112 of programmer 45 and a contact 114 of relay 65 controlled by diastolic amplifier 55, the stepping relay being operatively connected to actuate a resistance divider or signalling device 116 which is energized from a reference source 117 to provide a signal output through a circuit 118 and a read-out switch 120 to the recorder 100. The stepping relay pulses with each pulse of output of the diastolic amplifier 55 to provide a stepping action which adjusts the wiper of the potentiometer type device or divider 116 to provide a signal output in accordance with the number of pulses of relay 65. This will provide a voltage output in accordance with the number of blood pulses sensed by the photocell over a given time interval. The stepping relay 110 and resistance divider 116 act as an analogue converter to count and convert the number of pulses to an analogue signal output or a measure of the number of pulses sensed. An interval switch 131 of the time delay type which operates the contacts 75, 101, and 41, previously indicated, is connected to and controlled by the operation of the relay 96 of the systolic amplifier 95 through a contact 98 of the relay and connections indicated at 138 and 139. A reset contact 59 for the interval switch is operated by the programmer 45 to insure that the interval switch will operate only during a period when measurements are being taken and will prevent extraneous signals from operating the switch after the systolic blood pressure measurement is taken until a new cycle of measurement has commenced. The contacts 112 connecting the stepping relay 110 to the pulse relay 65 of diastolic amplifier 55 are closed by the programmer 45 during the initial portion of the measurement cycle while reset contact 136 for the stepping relay is open. After the pulse measurement period is complete, contact 112 opens and contact 136 closes to reset the stepping relay and the signalling device 116 back to the starting position for a new cycle of measurement. In addition, the time delay interval switch includes the switch contact 41 which is connected in a series circuit with switch 40 of programmer 45 to control the energization of solenoid valve 31. Normal blood flow in the ear without air pressure in the clamp of the ear piece is sufficient to produce a signal output from the photocell to periodically energize the systolic amplifier and keep the internal switch closed once it has been closed by contact 59. Since the programmer 45 at the outset closes switch 59 pulling in interval switch 131, the contact 41 will be closed at the outset of measurement. Contact 98 included in a time delay holding circuit (not shown) keeps interval switch 131 operated as long as it is not left unoperated for a period of over three or four seconds. With the series circuit for solenoid 31 complete, the valve wil close, permitting a pressure build up in the clamp of the ear piece while contacts 75 and 101 are also closed during the pulse measurement period and relays 65 and 96 are operating, read-out contacts 85 and 105 are open so that no blood pressure signals reach the recorder.

As indicated above, reset switch 60 which is operated by the programmer 45, operates to shunt condenser 52 and under these conditions the diastolic amplifier 55 will respond directly to the pulsed output of the photocell. These conditions maintain during measurement of pulse rate and during this period the pressure source 32 does not alter the pressure in the chamber 20 of the ear piece significantly since contact 40 keeps the pressure system vented to the atmosphere. Following the measurement of pulse rate the programmer closes contact 40 and opens contacts 60 and 59. The pressure in chamber 20 then increases to vary blood flow in the ear and the photocell 25 provides an increasing voltage output to the preamplifier 50. During the pulse rate measurement period the contacts 59 and 112 will be closed by the programmer and the interval switch 131 will remain energized, keeping contacts 41, 75 and 101 closed. The reset contact 136 of the programmer will be open. During a larger portion of this time period the remaining contacts of the programmer will be open and no signals will be applied to the recorder. During this period the counting operation of the stepping relay, which is converted into an electrical analogue output, will provide a pulse count for the recorder which after a predetermined time period will be read out to the recorder through operation of switch 120. The interval switch which as indicated above is of the time delay type will remain closed between each pulse of signal output since the time delay circuit (shown in part) is being constantly reset through switch contact 98 of the systolic pulse relay. The interval switch had been initially energized and sustained in energization through contact 59 which is open at this time. Upon reaching the systolic blood pressure point, the signal output from the photocell will go to zero so the systolic relay will cease pulsing and the interval switch will open, dropping out contacts 41, 75 and 101 thereby isolating the memory capacitors 70 and 102 from the pressure to voltage transducer 34 and releasing or opening valve 31. During this period programmer 45 will have also opened contact 59 so the interval switch can drop out. A contact in the interval switch (not shown) only allows contact 59 to re-energize it once it has dropped out. In this event should any extraneous signals be sensed by the amplifier 95 corresponding error voltages will not be placed on the memory capacitors before they can be read out to the recorder. Prior to this time, the programmer will have opened switch 112 and closed switch 136. The latter switch establishes a reverse energization circuit through the structure of the stepping relay 110 which will cause it to operate back to its original position. As indicated above, the amplifiers, preamplifier, relays and stepping relay together with the signal transducers are all of the conventional type and their details have been omitted for simplicity.

Figure 3:
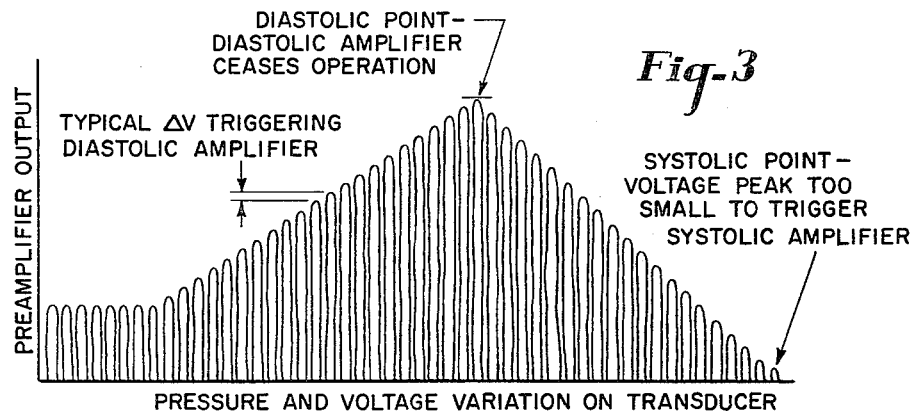
FIGURE 3 is a graph relating pressure to electrical response in the apparatus.
Figure 4:
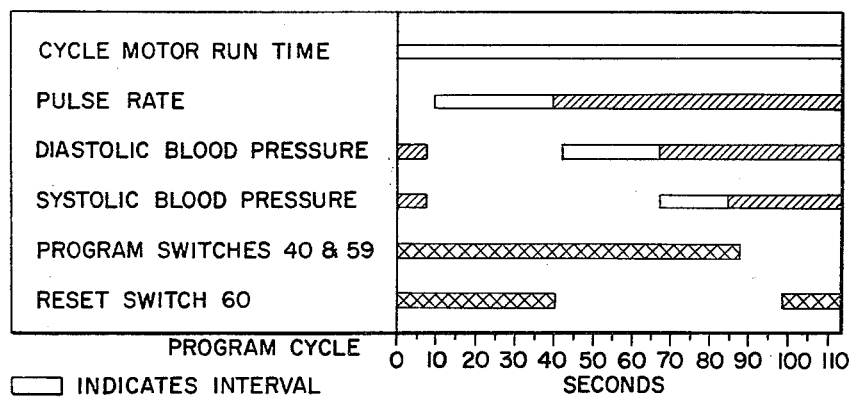
FIGURE 4 is a graph indicating the on and off periods for the switching circuitry of the programming portion of the apparatus.

In considering the operation of the apparatus reference is made to the graph 4 showing the time sequence of operation of the switches associated with the program controller 45. It will be noted that valve 31 of the pressure source is initially energized through operation of switches 40 and 41 to close the conduit to the atmosphere and seal the pneumatic system so that the cam may operate on the pressure bellows source 32 to raise the pressure in chamber 20. During this period the program reset switch 60 is closed for the pulse counting operation and the contact 112 of the programmer will be closed for operation of the stepping relay. The read-out switch 120 will be closed at the end portion of this period during which time it connects the count of the pulse rate from the potential signalling device 116 to the recorder. During this period of time the cam 33 will be so positioned that it will be opening the bellows of the pressure source and there will be no pressure in chamber 20 since valve 31 is venting and the photocell output will be at the level indicated in the graph 3 of a small but uniform magnitude. As pressure is applied to the bellows 32 from the cam 33 the pressure in chamber 20 will increase when valve 31 is energized. At this portion, the reset switch 60 is open and the blood in the capillaries of the ear pulsing because of normal heart operation will vary the optical density of the ear and hence the variation in light from the light source to the photocell to cause an increasing alternating current output. As the pressure is slowly increased by the bellows, the alternating current signal from the photocell increases and reaches a maximum pressure corresponding to the point of diastolic blood pressure. During this period of time the systolic and diastolic amplifiers 55 and 95 have been receiving a pulsed voltage output with increasing voltage pulses. The limiting network including the condenser 52 and rectifiers 53, 57 leading to the diastolic amplifier will respond only to increasing voltage pulses caused by the build up in pressure and the change in optical density in the ear as blood is forced out of the capillaries. It is during this period of time that the read-out switch 120 is closed and the pulse rate signal is fed to the recorder. As the diastolic and systolic amplifiers respond to varying voltage pulses, they operate the relays which connect through their switches the pressure to voltage transducer 34 to the memory capacitors 70 and 102. Each time one of the relays operates the pressure to voltage transducer is connected to the respective capacitors. Since the diastolic relay makes its last pulse when the blood pressure is at the diastolic pressure point and the systolic relay makes its last pulse when the pressure in chamber 20 and hence on the transducer 34 is at the systolic pressure point the proper value can be left on the memory capacitors. The associated memory read-out amplifiers then feed the corresponding outputs to the recorder without discharging the capacitors. As indicated by the graph in FIGURE 3 this diastolic pressure point is reached when the change in optical density in the ear and hence the photocell output reach a maximum at which point the charge on the memory condenser 70 will correspond to the pressure in the clamp of the ear piece. The continuing pressure applied from bellows 32 acting as a pressure source will force more and more blood from the capillaries to a point where the pulsing blood will not be able to enter the portion of the ear which is pressurized between the light source and photocell at which point the optical density variation will be at a minimum and the photocell output will be zero. However, at this point the voltage signal from the pressure transducer 34 will be at a maximum leaving the maximum charge on the condenser 102. Slightly after these points, the switches 85, 105 respectively close to connect the outputs of the amplifiers 80, 104 to the recorder, recording systolic and diastolic pressure points.

The valve 31 is opened rapidly after the systolic point is reached through de-energization of interval switch 41 and the switch 40 is also opened to exhaust the pressure chamber 20 and prevent any further pressure application to this ear. The cam 33 also rotates towards its original position, releasing the bellows 32. The program selector or controller rotates back to its original position to renew the sequence starting with the shorting of condenser 60 and the closing of the switch contacts initiating a new sequence of measurement.

While I have shown in this apparatus only two or three measurements of physical functions of a being it should be recognized that other physical properties can be sensed and recorded in a similar manner. It should be recognized, however, that this apparatus provides a simple and accurate means of measuring systolic and diastolic blood pressure while at the same time utilizing these measurements for determining pulse rate. Further the measurement is taken on a rise in pressure at which point the pressure is released from the portion of the body in which blood is occluded to provide for a minimum of period of time during which the clamping or occluding process takes place. This minimizes the physical discomfort and abnormal effects on the portion of the body involved such that repeated measurements may be taken with repeatability and accuracy of results.

In considering this invention it should be remembered that the present disclosure is intended to be illustrative only and I wish to be limited only by the appended claims.

I claim:

1. Apparatus for automatically sensing and recording a plurality of body functions comprising a primary sensor including a light source and photocell combination and a variable pressure clamping means, a source of variable pressure connected to said clamping means, means for cyclically adjusting said pressure source, signalling means connected to said clamping means for converting variable pressures therein to an electrical signal output proportional to the same, said sensor being adapted to be mounted on a body and so aligned that when said sensor is associated with a body said clamping means can alter the flow of blood through a portion of the body affected by said clamping means to vary the amount of light from said light source to said photocell, said photocell when so clamped on a body being adapted to produce an output of pulsed signals in accordance with blood flow providing a maximum output in accordance with a lack of blood in the portion of the body when clamped and a minimum output under normal conditions of blood flow in the body, a first circuit means connected to said photocell and including a voltage peak detecting circuit means, an amplifier, a relay connected to and controlled by said amplifier connected to said peak detecting circuit and providing pulsed operation of said relay in accordance with pulsed input signals thereto from said photocell as long as each succeeding pulsed signal is larger than the preceding signal, switching circuit means including a part of said relay of said amplifier and connected to the signalling means, a memory circuit means including a capacitor connected to said relay switching circuit means and adapted to receive the signal output from said signalling means with each pulsed operation of said relay means, first output circuit means connected to said memory circuit means and responsive to the signal on said capacitor, second circuit means connected to said photocell and responsive to the pulsating signal output thereof, a second amplifier and relay means connected to said second circuit means and operated in accordance with said pulsed signal output, second switching means included in said second relay means connected to said signalling means, memory circuit means including a second capacitor connected to said second relay switching means and responsive to the output of said signalling means, second output circuit means connected to and responsive to the signal on said second capacitor, third circuit means connected to said first circuit means and including a stepping relay responsive to the pulsed output of said photocell, transducer means providing an analogue signal output connected to said stepping relay means, a recorder, and a motor driven switching circuit means cyclically connecting said first and second output circuit means and said analogue transducer means to said recorder.

2. Apparatus for automatically sensing and recording a plurality of body functions comprising a primary sensor including a light source and photocell combination and a variable pressure clamping means, a source of variable pressure connected to said clamping means, means for cyclically adjusting a pressure source, signalling means connected to said clamping means for converting variable pressures therein to an electrical signal output proportional to the same, said sensor being adapted to be mounted on a body and so aligned that when said sensor is associated with a body said clamping means can alter the flow of blood through a portion of the body affected by said clamping means to vary the amount of light from said light source to said photocell, said photocell when so clamped on a body being adapted to produce an output of pulsed signals in accordance with blood flow providing a maximum output in accordance with a lack of blood in the portion of the body when clamped and a minimum output under normal conditions of blood flow in the body, a first circuit means connected to said photocell and including a voltage peak detecting circuit means and an amplifier, a relay connected to and controlled by said amplifier connected to said peak detecting circuit and providing pulsed operation of said relay in accordance with pulsed input signals thereto from said photocell as long as each succeeding pulsed signal is larger than the preceding signal, switching circuit means including a part of said relay of said amplifier and connected to the signalling means, a memory circuit means including a capacitor connected to said relay switching circuit means and adapted to receive the signal output from said signalling means with each pulsed operation of said relay means, first output circuit means connected to said memory circuit means and responsive to the signal on said capacitor, second circuit means connected to said photocell and responsive to the pulsating signal output thereof, a second amplifier and relay means connected to said second of circuit means and operated in accordance with said pulsed signal output, second switching means included in said second relay means, connected to signalling means and memory circuit means including a second capacitor connected to said second relay switching means and responsive to the output of said signalling means, second output circuit means connected to and responsive to the signal on said second capacitor, a recorder, and a motor driven switching circuit means cyclically connecting said first and second output circuit means to said recorder.

3. Apparatus for automatically sensing and recording a plurality of body function comprising a primary sensor including a light source and photocell combination and a variable pressure clamping means, a source of variable pressure connected to said clamping means, means for cyclically adjusting said pressure source, signalling means connected to said clamping means for converting variable pressures therein to an electrical signal output proportional to the same, said sensor being adapted to be mounted on a body and so aligned that when said sensor means is associated with a body said clamping means can alter the flow of blood through a portion of the body affected by said clamping means to vary the amount of light from said light source to said photocell, said photocell when so clamped on a body being adapted to produce an output of pulsed signals in accordance with blood flow providing a maximum output in accordance with a lack of blood in the portion of the body when clamped and a minimum output under normal conditions of blood flow in the body, a first circuit means connected to said photocell and including means responding only to increasing signal outputs, an amplifier and a relay connected to and controlled thereby providing pulsed operation of said relay in accordance with increasing pulsed input signals, memory circuit means, switching circuit means including a part of said relay connecting said signalling means to said memory circuit means, first output circuit means connected to said memory means and controlled thereby, second circuit means connected to said photocell and responsive to the pulsating signal output thereof, second amplifier and relay means connected to said second of circuit means and operated in accordance with said pulsed signal output, second switching means included in said second relay means connected to said signalling means, memory circuit means including a second capacitor connected to said second relay switching means and responsive to the output of said signalling means, second output circuit means connected to and responsive to the signal on said second capacitor, third circuit means connected to said first named relay means and including a stepping relay responsive to the pulsed output of said photocell, transducer means providing an analogue signal output connected to said stepping relay means, a recorder, and a motor driven switching circuit means cyclically connecting said first and second output circuit means and said analogue transducer means to said recorder.

4. Apparatus for automatically sensing and recording a plurality of body functions comprising a primary sensor including a light source and photocell combination and a variable pressure clamping means, a source of variable pressure connected to said clamping means, and means for cyclically adjusting said pressure source, signalling means connected to said clamping means for converting variable pressures therein to an electrical signal output proportional to the same, said sensor being adapted to be mounted on a body and so aligned that when said sensor means is associated with a body said clamping means can alter the flow of blood through a portion of the body affected by said clamping means to vary the amount of light from said light source to said photocell, said photocell when so clamped on a body being adapted to produce an output of pulsed signals in accordance with blood flow providing a maximum output in accordance with a lack of blood in the portion of the body when clamped and a minimum output under normal conditions of blood flow in the body, a first circuit means connected to said photocell and including a voltage peak detecting circuit means, an amplifier, a relay controlled by said amplifier connected to said peak detecting circuit and providing pulsed operation of said relay in accordance with pulsed input signals thereto as long as each succeeding pulsed signal is larger than the preceding signal, resetting circuit means connected to said peak detecting circuit means, switching circuit means included in part in said relay of said amplifier and connected to the signalling means, a memory circuit means including a capacitor connected to said relay switching circuit means and adapted to receive the signal output from said signalling means with each pulsed operation of said relay means, first output circuit means connected to said memory means and responsive to the signal on said capacitor, second circuit means connected to said photocell and responsive to the pulsating signal output thereof, second amplifier and relay means connected to said second of circuit means and operated in accordance with said pulsed signal output, second switching means included in said second relay means connected to said signalling means, memory circuit means including a second capacitor connected to said second relay switching means and responsive to the output of said signalling means, second output circuit means connected to and responsive to the signal on said second capacitor, third circuit means connected to said first relay means and including a stepping relay responsive to the pulsed output of said photocell, transducer means providing an analogue signal output connected to said stepping relay means, a recorder, and a motor driven switching circuit means cyclically connecting said first and second output circuit means and said analogue transducer means to said recorder and operating said resetting circuit means and pressure adjustment means.

5. Apparatus for detecting a plurality of body functions comprising a sphygmomanometer type device including a light source and photocell detection unit and means for variably applying pressure to said device, a pressure to electrical signal transducer connected to and associated with said device to produce a signal in proportion to the pressure applied to said device, said light source photocell combination of said sphygmomanometer when applied to a body being adapted to produce a pulsed signal output indicative of the presence or absence of blood in the area of the body to which the sphygmomanometer is applied, first circuit means connected to and controllably energized by said photocell, said first circuit means including said pressure to electrical signal transducer and operative to produce a signal in proportion to diastolic blood pressure of the body when said device is so applied, a second circuit means including said pressure to signal transducer connected to and controllably energized from said photocell and adapted to produce a signal output in proportion to systolic blood pressure of a body when said device is applied to a body, and third circuit means including an analogue converter connected to and controlled by said first circuit means and adapted to produce a signal output indicative of the number of blood pulses sensed in said area of said sphygmomanometer when said device is applied to a body, recorder means, and switching means connected to said first, second and third circuit means and said pressure varying means adapted to sequentially connect said circuits to said recorder means and to operate said pressure varying means in a predetermined sequence.

6. Apparatus for detecting a plurality of body functions comprising a sphygmomanometer type device including a light source and photocell detection unit and means for variably applying pressure to said device, a pressure to electrical signal transducer connected to and associated with said device to produce a signal in proportion to the pressure applied to said device, said light source photocell combination of said sphygmomanometer when applied to a body being adapted to produce a pulsed signal output indicative of the presence or absence of blood in the area of the body to which the sphygmomanometer is applied, first circuit means connected to and controllably energized by said photocell, means included in said first circuit means permitting said first circuit means to be controlled by said photocell only on an increasing signal output therefrom, said first circuit means including said pressure to electrical signal transducer and operative to produce a signal in proportion to diastolic blood pressure of the body when said device is so applied, a second circuit means including said pressure to signal transducer connected to and controllably energized by said photocell and adapted to produce a signal output in proportion to systolic blood pressure of a body when said device is applied to a body, and third circuit means including an analogue converter connected to and controlled by said first circuit means and adapted to produce a signal output indicative of the number of blood pulses sensed in said area of said sphygmomanometer when said device is applied to a body, recorder means, and switching means connected to said first, second and third circuit means and said pressure varying means adapted to sequentially connect said circuits to said recorder means and to operate said pressure varying means in a predetermined sequence.

7. Apparatus for detecting a plurality of body functions comprising a sphygmomanometer type device including a light source and photocell detection unit and means for variably applying pressure to said device, a pressure to electrical signal transducer connected to and associated with said device to produce a signal in proportion to the pressure applied to said device, said light source photocell combination of said sphygmomanometer when applied to a body being adapted to produce a pulsed signal output indicative of the presence or absence of blood in the area of the body to which the sphygmomanometer is applied, first circuit means connected to and controllably energized by said photocell, means including a peak detection circuit means included in said first circuit means, said first circuit means including switching means connecting said pressure to electrical signal transducer to a read-out circuit and operative to produce a signal in proportion to diastolic blood pressure of the body when said device is so applied, a second circuit means including a second switching circuit means connecting said pressure to signal transducer to a second read-out circuit and controllably energized by said photocell being adapted to produce a signal output in proportion to systolic blood pressure of a body when said device is applied to a body, and third circuit means including an analogue converter connected to a third read-out circuit and controlled by being said first circuit means being adapted to produce a signal output indicative of the number of blood pulses sensed in said area of said sphygmomanometer when applied to a body, and timed switching means connected to said first, second and third read-out circuits and said pressure varying means adapted to sequentially connect said circuits to a recorder and to operate said pressure varying means in a predetermined sequence.

8. Apparatus for detecting a plurality of body functions comprising a sphygmomanometer type device including a light source and photocell detection unit and means for variably applying pressure to said device, a pressure to electrical signal transducer connected to and associated with said device to produce a signal in proportion to the pressure applied to said device, said light source photocell combination of said sphygmomanometer when applied to a body being adapted to produce a pulsed signal output indicative of the presence or absence of blood in the area of the body to which the sphygmomanometer is applied, first circuit means connected to and controllably energized by said photocell, said first circuit means including said pressure to electrical signal transducer and operative to produce a signal in proportion to diastolic blood pressure of the body when said device is so applied, a second circuit means including said pressure to signal transducer connected to and controllably energized from said photocell and adapted to produce a signal output in proportion to systolic blood pressure of a body when said device is applied to a body, and third circuit means including an analogue converter connected to and controlled by said first circuit means and adapted to produce a signal output indicative of the number of blood pulses sensed in said area of said sphygmomanometer when said device is applied to a body, recorder means, and means connected to said second circuit for releasing pressure on said device in the absence of signal from said photocell.

9. Apparatus for detecting a plurality of body functions comprising a sphygmomanometer type device including a light source and photocell detection unit and means for variably applying pressure to said device, a pressure to electrical signal transducer connected to and associated with said device to produce a signal in proportion to the pressure applied to said device, said light source photocell combination of said sphygmomanometer when applied to a body being adapted to produce a pulsed output indicative of the presence or absence of blood in the area of the body to which the sphygmomanometer is applied, first circuit means connected to and controllably energized by said photocell, said first circuit means including said pressure to electrical signal transducer and operative to produce a signal in proportion to diastolic blood pressure of the body when said device is so applied, a second circuit means including said pressure to signal transducer connected to and controllably energized from said photocell and adapted to produce a signal output in proportion to systolic blood pressure of a body when said device is applied to a body, and third circuit means including an analogue converter connected to and controlled by said first circuit means and adapted to produce a signal output indicative of the number of blood pulses sensed in said area of said sphygmomanometer when said device is applied to a body, recorder means, and time delay means connected to said second circuit and operative to release pressure in said device when the systolic pressure point is reached.

10. Apparatus for automatically sensing and recording a plurality of body functions comprising a primary sensor including a light source and photocell combination and a variable pressure clamping means, a source of variable pressure connected to said clamping means, means for cyclically adjusting said pressure source, signalling means connected to said clamping means for converting variable pressures therein to an electrical signal output proportional to the same, said sensor being adapted to be mounted on a body and so aligned that when said sensor is associated with a body said clamping means can alter the flow of blood through a portion of the body affected by said clamping means to vary the amount of light from said light source to said photocell, said photocell when so clamped on a body being adapted to produce an output of pulsed signals in accordance with blood flow providing a maximum output in accordance with a lack of blood in the portion of the body when clamped and a minimum output under normal conditions of blood flow in the body, a first circuit means connected to said photocell and including a voltage peak detecting circuit means, an amplifier, a relay connected to and controlled by said amplifier connected to said peak detecting circuit and providing pulsed operation of said relay in accordance with pulsed input signals thereto from said photocell as long as each succeeding pulsed signal is larger than the preceding signal, switching circuit means included in part in said relay of said amplifier and connected to the signalling means, a memory circuit means including a capacitor connected to said relay switching circuit means and adapted to receive the signal output from said signalling means with each pulsed operation of said relay means, first output circuit means connected to said memory means and responsive to the signal on said capacitor, second circuit means connected to said photocell and responsive to the pulsating signal output thereof, a second amplifier and relay means connected to said second circuit means and operated in accordance with said pulsed signal output, second switching means included in said second relay means connected to said signalling means, a memory circuit means including a second capacitor connected to said second relay switching means and responsive to the output of said signalling means, second output circuit means connected to and responsive to the signal on said second capacitor, third circuit means connected to said first circuit means and including a stepping relay responsive to the pulsed output of said photocell, transducer means providing an analogue signal output connected to said stepping relay means, additional circuit means including a time delay relay and a switching contact connected to said second relay means and said variable pressure source and operative to rapidly release pressure on said clamping means upon the cessation of pulsed signals from said photocell, a recorder, and a motor driven switching circuit means cyclically connecting said first and second output circuit means and said analogue transducer means to said recorder and to operate said switching contact.

References Cited in the file of this patent

UNITED STATES PATENTS

| | | |
|---|---|---|
| 2,465,838 | Bernard | Mar. 29, 1949 |
| 2,493,301 | Loria et al. | Jan. 3, 1950 |
| 2,540,163 | Brosene et al. | Feb. 6, 1951 |
| 2,568,934 | Schenker | Sept. 25, 1951 |
| 2,711,728 | Bailey | June 28, 1955 |
| 2,756,741 | Campanella | July 31, 1956 |
| 2,827,040 | Gilford | Mar. 18, 1958 |
| 2,865,365 | Newland et al. | Dec. 23, 1958 |